United States Patent
Li et al.

(10) Patent No.: US 6,458,017 B1
(45) Date of Patent: Oct. 1, 2002

(54) PLANARIZING METHOD

(76) Inventors: Chou H. Li, Unit 404 8001 Sailboat Key Blvd., South Pasadena, FL (US) 33707; Suzanne C. Li, Unit 404, 800 Sailboat Key Blvd., South Pasadena, FL (US) 33707

( * ) Notice: Subject to any disclaimer, the term of this patent is extended or adjusted under 35 U.S.C. 154(b) by 0 days.

(21) Appl. No.: 09/391,596

(22) Filed: Sep. 8, 1999

Related U.S. Application Data

(60) Provisional application No. 60/112,182, filed on Dec. 15, 1998.

(51) Int. Cl.$^7$ .................................................. B24B 1/00
(52) U.S. Cl. ............................ 451/28; 451/57; 451/60; 451/285; 451/288
(58) Field of Search ......................... 451/28, 285, 287, 451/288, 446, 60, 57, 526, 527, 529, 533, 539

(56) References Cited

U.S. PATENT DOCUMENTS

| | | | |
|---|---|---|---|
| 2,163,407 A | 6/1939 | Pulfrich ........................ 18/59 |
| 2,570,248 A | 10/1951 | Kelley ......................... 29/179.5 |
| 2,667,432 A | 2/1954 | Nolte .......................... 117/123 |
| 2,708,787 A | 5/1955 | Chick et al. ................. 29/473.1 |
| 3,215,555 A | 11/1965 | Krey ........................... 117/123 |
| 3,281,309 A | 10/1966 | Ross ........................... 161/196 |
| 3,428,846 A | 2/1969 | Rigden et al. ............... 313/284 |
| 3,448,319 A | 6/1969 | Louden ....................... 313/221 |
| 3,452,310 A | 6/1969 | Israelson .................... 335/286 |
| 3,574,579 A | 4/1971 | Clarke ......................... 51/307 |
| 3,650,714 A | 3/1972 | Farkas ......................... 51/295 |
| 3,740,822 A | 6/1973 | Singleton .................... 29/419 |
| 3,753,758 A | 8/1973 | Shanley ....................... 117/25 |
| 3,777,220 A | 12/1973 | Tatusko et al. ........... 317/101 A |
| 3,901,772 A | 8/1975 | Guillotin et al. ............ 204/16 |
| 3,915,369 A | 10/1975 | Schmidt-Bruecken et al. ... 228/194 |
| 3,949,263 A | 4/1976 | Harper ......................... 315/3.5 |
| 4,009,027 A | 2/1977 | Naidich et al. .............. 75/154 |
| 4,018,576 A | 4/1977 | Lowder et al. ............... 51/309 |
| 4,075,364 A | 2/1978 | Panzera ........................ 427/34 |
| 4,109,031 A | 8/1978 | Marscher ..................... 427/191 |
| 4,111,572 A | 9/1978 | Noone et al. ................. 403/28 |
| 4,239,502 A | 12/1980 | Slack et al. ................... 51/295 |
| 4,252,856 A | 2/1981 | Sara ............................ 428/408 |
| 4,294,009 A | 10/1981 | Quintin et al. ................ 29/832 |
| 4,338,380 A | 7/1982 | Erickson et al. ............ 428/594 |
| 4,347,089 A | 8/1982 | Loehman ..................... 156/89 |
| 4,348,131 A | 9/1982 | Shimanuki et al. .......... 403/272 |
| 4,372,037 A | 2/1983 | Scapple et al. ............... 29/613 |
| 4,396,677 A | 8/1983 | Intrater et al. .............. 428/408 |

(List continued on next page.)

OTHER PUBLICATIONS

U.S. patent application Ser. No. 08/482,199, Li, filed Jun. 8, 1995.
U.S. patent application Ser. No. 09/053,741, Li, filed Apr. 2, 1999.
U.S. patent application Ser. No. 09/361,209, Li et al., filed Jul. 27, 1999.
U.S. patent application Ser. No. 09/334,565, Li, filed Jun. 21, 1999.
U.S. patent application Ser. No. 09/461,405, Li et al., filed Dec. 15, 1999.

*Primary Examiner*—Joseph J. Hail, III
*Assistant Examiner*—Lee Wilson

(57) ABSTRACT

A method for planarizing a material surface by providing a suspension of solid abrasive particles in liquid suspension of medium density $d_m$ which is within 2 to 15% of the substantially constant solid density $d_s$. The solid abrasive particles are thus generally freely and stably suspended in the suspension liquid n medium. Damage to the grinding and polishing qualities of the solid particles is minimized through reduced contact and collisions of the solid particles on one another.

33 Claims, 1 Drawing Sheet

U.S. PATENT DOCUMENTS

| | | | | |
|---|---|---|---|---|
| 4,404,262 | A | 9/1983 | Watmough | 428/539 |
| 4,529,836 | A | 7/1985 | Powers et al. | 174/94 |
| 4,529,857 | A | 7/1985 | Meek et al. | 219/10.55 M |
| 4,556,389 | A | 12/1985 | Ueno et al. | 433/206 |
| 4,593,851 | A | 6/1986 | Skog | 228/248 |
| 4,608,226 | A | 8/1986 | Lauvinerie et al. | 419/5 |
| 4,624,403 | A | 11/1986 | Kohno et al. | 228/122 |
| 4,703,884 | A | 11/1987 | Landingham et al. | 228/122 |
| 4,732,780 | A | 3/1988 | Mitoff et al. | 427/125 |
| 4,735,866 | A | 4/1988 | Moorhead | 428/627 |
| 4,750,914 | A | 6/1988 | Chikaoka et al. | 51/293 |
| 4,776,862 | A | 10/1988 | Wiand | 51/293 |
| 4,851,615 | A | 7/1989 | Butt | 174/68.5 |
| 4,890,783 | A | 1/1990 | Li | 228/122 |
| 4,899,922 | A | 2/1990 | Slutz et al. | 228/121 |
| 4,924,033 | A | 5/1990 | Iyogi et al. | 174/259 |
| 4,953,499 | A | 9/1990 | Anthony et al. | 118/724 |
| 4,958,592 | A | 9/1990 | Anthony et al. | 118/724 |
| 4,968,326 | A | 11/1990 | Wiand et al. | 51/293 |
| 4,970,986 | A | 11/1990 | Anthony et al. | 118/724 |
| 5,022,801 | A | 6/1991 | Anthony et al. | 408/144 |
| 5,110,579 | A | 5/1992 | Anthony et al. | 423/446 |
| 5,116,787 | A | 5/1992 | Dumbaugh, Jr. | 501/66 |
| 5,125,557 | A | 6/1992 | Tanaka et al. | 228/121 |
| 5,143,523 | A | 9/1992 | Matarrese | 51/293 |
| 5,161,728 | A | 11/1992 | Li | 228/124 |
| 5,190,823 | A | 3/1993 | Anthony et al. | 428/408 |
| 5,230,924 | A | 7/1993 | Li | 427/229 |
| 5,248,079 | A | 9/1993 | Li | 228/121 |
| 5,273,731 | A | 12/1993 | Anthony et al. | 423/446 |
| 5,349,922 | A | 9/1994 | Anthony et al. | 117/204 |
| 5,377,522 | A | 1/1995 | Anthony et al. | 72/467 |
| 5,392,982 | A | 2/1995 | Li | 228/124.5 |
| 5,419,276 | A | 5/1995 | Anthony et al. | 117/86 |
| 5,419,798 | A | 5/1995 | Anthony et al. | 156/345 |
| 5,424,096 | A | 6/1995 | Anthony et al. | 427/249 |
| 5,451,430 | A | 9/1995 | Anthony et al. | 427/122 |
| 5,464,665 | A | 11/1995 | Anthony et al. | 427/570 |
| 5,481,795 | A | 1/1996 | Hatakeyama et al. | 29/852 |
| 5,551,277 | A | 9/1996 | Anthony et al. | 72/467 |
| 5,573,607 | A | 11/1996 | Weaver | 148/437 |
| 5,573,985 | A | 11/1996 | Weaver | 501/96 |
| 5,582,540 | A * | 12/1996 | Su et al. | 451/60 |
| 5,755,614 | A * | 5/1998 | Adams et al. | 451/41 |
| 5,874,175 | A | 2/1999 | Li | 428/457 |
| 5,932,348 | A | 8/1999 | Li | 428/402 |
| 5,937,514 | A | 8/1999 | Li | 29/840 |

* cited by examiner

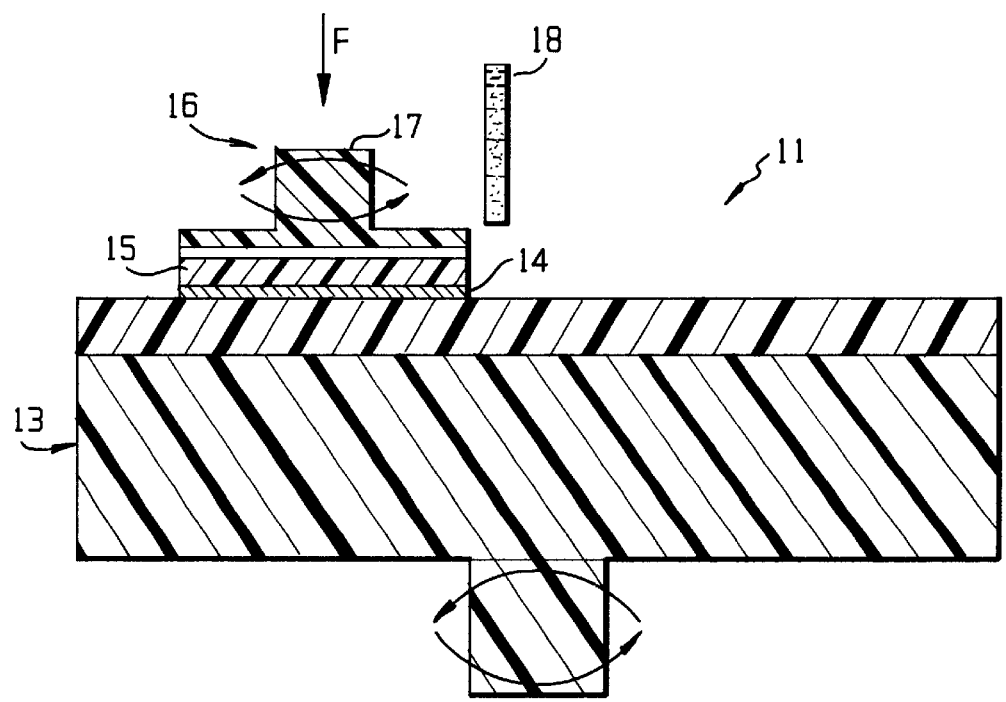
FIG.1
FIG.2
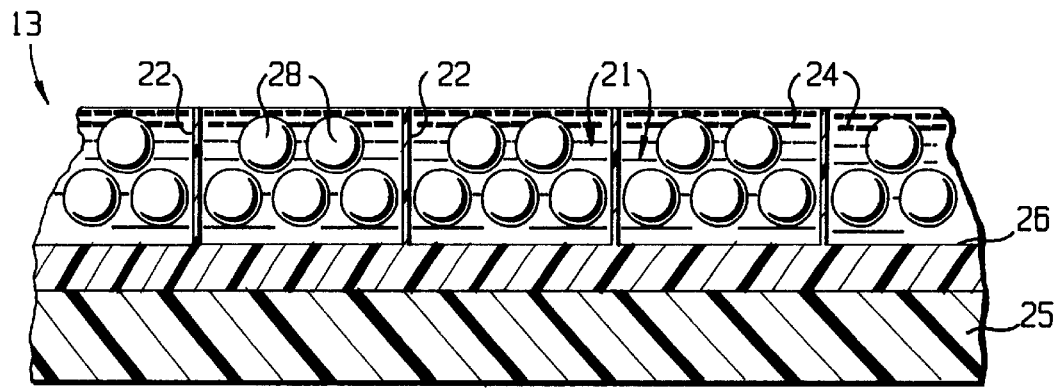

PLANARIZING METHOD

CROSS-REFERENCE TO RELATED APPLICATIONS

This is a continuation-in-part (CIP) of application Ser. No. 60/112,182 filed Dec. 15, 1998 which is hereby incorporated by reference into this application.

BACKGROUND OF THE INVENTION

The invention relates to improved protection methods for delicate or fragile, sharp-pointed materials; and more particularly to improved grinding and polishing method, equipment, and materials.

While the invention has many applications in protecting, e.g., jewelry, contact or impact sensitive and delicate parts or instruments, this invention relates more particularly to improved grinding and polishing applications, often with chemicals to help the planarization—hence the name chemical-mechanical polishing (CMP).

The CMP method of surface planarization is a dominant technology in polishing glass. It also meets planarization requirements in the <0.35 $\mu$m (micron) feature sized multi-level devices and interconnects in the semiconductor industry. The CMP method is a preferred technology to carry out global planarization for various integrated circuits (IC). Planarized surfaces have become key to the success of advanced semiconductor devices and circuits, particularly for high-density multi-level interconnects.

In IC manufacturing, CMP involves competing requirements at various length scales—e.g., uniform removal at the wafer scale, but non-uniform removal of protruding surfaces or areas to achieve planarization at the feature scale. The process, developed so far through trial-and-error, involves a synergistic interaction of many factors: fluid flow, fluid chemistry, slurry particle material, surface dissolution, and wafer material.

Ideally, the grinding and polishing method and equipment should provide: high uniformity and selectivity, low defect levels, high removal rate, low-pressure/high-speed capability, short product development time, and low cost. Also, the solid grinding/polishing abrasive materials should always remain as sharp as possible (always sharp), efficient, long-lasting, and low in initial and operating costs for rapid, reproducible grinding and polishing operations.

Grinding, polishing, or planarizing is widely used in many industries such as automotive, electronics, optical, machinery, metallurgical, medical, and glass. The quality and performance of an automobile, electronic components, optical instruments, precision machinery, glass plate, metallurgical material, or biomedical samples often critically depend on the cost and quality, e.g., flatness, surface finish, and reproducibility, of the planarized material. A perfectly planarized sample is often not available, too costly, or even impossible to obtain.

Making a modern 0.25 $\mu$m CMOS IC chip requires 13 planarizing steps. A single major defect in any one step can result in the rejection of the entire chip lot. Even if each planarizing step has a yield of 99%, the final product yield loss from the 13 planarizing steps alone is over 12.2%. Raising yields from 99% to 99.5% in the planarizing steps still incurs a planarizing loss of 6.3%. This is still a big production and financial loss.

A planarizing machine is often used to obtain a planar, smooth outer surface on a material. The prior-art grinding or polishing machine often comprises a rotating wheel for mounting the material thereon. A colloidal liquid or liquid abrasive suspension is provided to wet the wheel and to hold/mount the material against the rotating wheel. The liquid suspension comprises a liquid suspension medium and a plurality of abrasive solid particles suspended therein. The liquid suspension is fed onto the wheel to chemically and mechanically grind or polish off surface layers of the mounted material. Both manual and automatic planarizing machines have been known in the art for quite some time.

But these machines are not satisfactory in many respects. The liquid suspension is costly but it is not reproducible; has short shelf lives; deteriorates in performance during use, transit, or even storage; and does not reliably produce quality product results. The solid abrasive particles wear out rapidly degrading the planarizing results. The solid abrasive particles also often agglomerate or break up into smaller pieces. Changes in particle size alone lead to loss of control of the desired surface finish. A large size distribution of abrasive particles produces a wide variety of surface finishes of differing smoothness and qualities, hampering product yield and reproducibility.

The hard, sharp, and brittle working edges or points on the solid abrasive particles are easily damaged, producing products of variable quality even during the same planarizing run. Damaged or worn-out particles always give inferior results. The planarizing process is inefficient. The process is also costly and nonreproducible.

SUMMARY OF THE INVENTION

A method of improving a planarizing process comprises: providing an ever-present protective or cushioning layer all around each solid abrasive particle to prevent its direct contact with its neighbors or with another solid object. The protective or cushioning layer preserves the critical tiny, rigid, sharp but brittle working edges or points on these solid particles. This can be achieved simply by selecting a liquid suspension medium having a density nearly equal to that of the solid abrasive particles. Improved equipment and a new planarizing suspension containing the special solid abrasive particles for practicing the new planarizing method are also disclosed.

To overcome the foregoing and other difficulties, the general object of this invention is to protect small abrasive particles, delicate parts, components, jewelry, or even small instruments from damage during their preparation, use, transit, and storage;

Another object of the invention is to provide an improved method to minimize damage on the working quality of a planarizing medium;

Yet another object of the invention is to provide an improved planarizing medium that is not only highly effective but longer-lasting;

It is another object of the invention to provide improved planarized surface finishes, rapidly and at low cost;

Yet another object is to provide a planarizing suspension in which the solid abrasive particles are practically forever sharp prior to use;

A further object is to greatly improve the material use efficiency of the solid abrasive particles in the planarizing operations.

Various other objects and advantages, and a more complete understanding of the invention, will become apparent to those skilled in the art from the following description and claims, taken in conjunction with the accompanying drawings.

BRIEF DESCRIPTION OF THE DRAWINGS

To illustrate the invention, there is shown in the drawing the forms which are particularly preferred. It is understood, however, that the invention is not necessarily limited to the precise arrangements and instrumentalities here shown but, instead, may combine the same described embodiments or their equivalents is various forms.

FIG. 1 shows a vertical section through a part of an improved planarizing device; and FIG. 2 is a vertical section through a part of a polishing pad on the planarizing wheel of FIG. 1 specifically showing the pad compartmented pockets containing the individualized solid abrasive particles.

DESCRIPTION OF THE PREFERRED EMBODIMENTS

We have found that a principal planarizing problem is the difficulty of maintaining a uniform, high-quality slurry of planarizing suspension. This suspension must be reproducible, not easily damaged and, therefore, longer lasting. We will provide in this invention a new planarizing suspension to maintain the solid abrasive particles "ever-sharp" during processing, use, transit, or even storage of the abrasive liquid suspensions.

Each of the very fine, micron or nanometer size range solid abrasive particles (typically of $Al_2O_3$) has many tiny, rigid, sharp, yet brittle working edges and points on their outer surfaces. The shape, size, perfection, and sharpness of these microscopic planarizing edges and points determine the cost, life, and performance of the planarizing liquid suspension and, in fact, the entire planarizing operation.

During their useful life, the solid abrasive particles, together with their sharp edges and points, continuously touch, contact, impact, and degrade one another. Millions of solid abrasive particles are usually carried in a limited volume amount, single slurry suspension bottle. During movement of the storage bottle or during handling of the abrasive slurry such as feeding onto the polishing wheel, many of the sharp edges and points touch one another or the container wall, sufficiently strongly relative to the tininess and brittleness of these edges and points. This contact affects the performance or quality of these solid abrasive particles.

In addition, during the use of the planarizing liquid suspension, the liquid stream containing the solid abrasive particles must be pumped or pushed around intricate pump vanes, valve seats, liquid conduits, duct walls, etc. making right, left, Y-, or U-turns while simultaneously changing in shape, size, velocity, acceleration, and direction.

In the conventional planarizing liquid slurries, the solid abrasive particles have a common average density very different from that of the liquid suspension medium. Settling due to gravity occurs. Differential accelerations, velocities, and movement due to differing densities of solid and liquid also allows neighboring solid abrasive particles pushing away the less-accelerating, intervening protective suspension liquid. The resultant direct contact between the neighboring solid particles can damage both particles precisely at the critical tiny working edges or points.

The solid abrasive particles in the liquid slurry fed vertically downward onto the polish pad (See FIG. 1) also can touch one another, possibly in mid-air but most probably when reaching the polish pad. The solid abrasive particles, stripped bare of any slower-moving or slower-accelerating, protective suspension liquid medium, also contact one another and the polishing pad. Once on the polishing pad, the slurry droplets flatten, distort in shape, and change their movements, velocities, accelerations or decelerations relative to each other and to the lighter-density protective liquid medium between the particles. Such changes are different even in different parts of the same slurry droplet or stream. More damaging contacts between the brittle working edges or points on the solid abrasive particles again result.

The solid abrasive particles spiral out on the rotating polishing pad toward the periphery thereof. More complications again arise due to: liquid splashing, centrifugal forces, different thicknesses or sizes of the suspension liquid film containing the gravitationally and force-segregated solid particles, and vastly greater contact area (for adhesion and friction) between the polishing pad and the suspension liquid film relative to the tiny solid abrasive particles with minimum bottom contact areas to the same pad, etc. All these complications further separate or segregate the solid abrasive particles from their protective suspension liquid films. More direct impact of the brittle solid abrasive particles and damage of the working qualities of these particles again result.

Before reaching the material surface to be planarized, the solid abrasive particles may already be damaged or worn-out. A material use efficiency of less than 100% is therefore expected with the conventional planarizing suspension.

To preserve the working quality and efficiency of these liquid suspensions, we pay particular attention to the millions of microscopic working edges and points on the solid abrasive particles. Specifically, we minimize the damage by the contacting or impacting neighboring particles during the entire life of these solid abrasive particles.

A new and successful method for this invention may be practiced by continuously protecting each of the solid abrasive particles with an inseparable, sufficiently thick, individual protective or cushioning layer of the colloidal or liquid suspension medium. To achieve this result, the solid abrasive particles must have a common density, $d_s$, which is sufficiently close to that of the suspension or colloidal liquid medium, $d_m$. The solid abrasive particles can then suspend freely and stably in the liquid medium, and are always protected and cushioned on all their outer surfaces, where the tiny fragile working edges and points are located.

For example, the liquid medium density $d_m$ may be within 2 to 15%, more preferably within 10–13% but possibly within 2–3% of the substantially constant solid density $d_s$. The solid abrasive particles are thus generally freely and stably suspended in the suspension liquid medium. Damage to the grinding and polishing qualities of the solid particles is thus minimized through reduced contacting or impacting of the solid abrasive particles on one another.

Preferably, not even a single direct contact between any two neighboring abrasive particles is allowed. During the processing, use, transit, or storage of the liquid suspension, there should be little differential movement, velocities, accelerations, or forces between any two neighboring abrasive particles, relative to one another, to the container wall of the suspension, and also to the suspension liquid medium. This is possible because the suspension liquid medium and the solid abrasive particles now nearly all have the same densities, masses per given volume, velocities, and accelerations. No direct force exchanges or momentum transfer between neighboring solid particles are possible. The brittle working edges or points are then protected.

The density of the suspension liquid medium and that of the solid abrasive particles are now nearly the same. There is no difference in movement, velocities, accelerations, and forces between the suspension liquid medium and the solid abrasive particles. Hence, the suspension liquid medium between any two neighboring solid abrasive particles, or between one abrasive particle and the nearby wall of the container, is not reduced in thickness thereby constantly providing an effective cushioning or protective layer between these two neighboring particles, or between the one solid abrasive particle and the nearby wall of the container. Accordingly, the sharp and brittle working edges or points on the solid abrasive particles are also permanently protected, because of the absence of excessive contacting or, even worse, impacting movements and forces.

As a result, the abrasive liquid suspension will have a much longer life limited only by its actual use in grinding and polishing. The working qualities of the liquid suspension will be nearly the same throughout its life subject, of course, to its actual usage. Low-cost, reproducibly high-quality surface finishes of the planarized parts are then possible even for high-speed operations.

The attached figures show a planarizing machine in a sectional side view with parts removed and other parts shown somewhat schematically. The illustrated planarizer in FIG. 1 has a polishing wheel 11 rotating about a vertical axis in a counter clockwise direction. On top of the wheel 11 is a polishing pad 13 which is more fully shown in FIG. 2 as pad 13. The polishing wheel 11 and pad 13 rotate at about 30–90 rpm. On the left side of the wheel 11, there is a wafer carrier 16 which carries the silicon wafer 15 thereunder via, for instance, a double-sided adhesive tape 14. The wafer is under a downward force or pressure F (see FIG. 1) of from 2 to 9 psi, applied through the stem 17. A slurry 18 of the solid abrasive particles, typically of $Al_2O_3$, is shown feeding the suspended abrasive slurry 18 in a downward direction onto the polishing pad 13 at an off-center point. Note that the stem 17 and the wafer carrier 14 also rotate in a counter clockwise direction, though not necessarily at the same rotational speed.

Changes in other slurry properties, such as pH, temperature, slurry particle composition, stream size and shape, degree of agglomeration, and slurry weight percent, also have profound effects on the polishing chemistry and material removal rates. In oxide CMP at high pH, both dissolving surface material and the slurry particles will have similar, hydrated surface layers.

Peroxide addition greatly affects the removal rate of PN barrier layer material, but only slightly on the aluminum and oxide. CMP of Cu, Ta, and TaN is often done with a slurry containing alumina particles, with the pH controlled by $NH_4OH$. The commonly used oxidizers in CMP are $H_2O_2$, $KIO_3$, $K_3Fe(CN)_6$ and $Fe(NO_3)_3$. The CMP action appears to be dominated by the direct abrasion of the surface film layer by the solid abrasive particles in the slurry.

An oxidizing agent is used to make copper ions on copper material. Organic acid is also used to form a chelate complex of copper in the slurry. The copper is surface oxidized by $H_2O_2$. The oxidized convex layer prevents copper from etching by a glycine/diluted $H_2O_2$ slurry, but is removed by the polishing cloth.

CMP process generally is a combined mechanical wear and chemical corrosion process for polishing. In CMP of W (tungsten) surfaces in the presence of 0.5 M $H_2SO_4$, e.g., a little wear occurs with a cathodic potential, but increases with an anodic applied potential.

Copper surface CMP, under highly acidic conditions leads to severe corrosion, while under alkaline conditions the copper polish rate selectivity with respect to $SiO_2$ is unfavorable, leading to interlevel dielectric (ILD) erosion. An intermediate pH value of 3–7 is better. Benzotriazole is often used as an corrosion inhibitor.

Many $H_2O_2$-glycine base slurries contain $SiO_2$ or $Al_2O_3$. In these slurries, the copper dissolution rate and polish rate increase with increasing glycine concentration. The dissolution/polish rate increases with increasing $Cu^{++}$ ions and levels off beyond a concentration that depends on the glycine concentration. Both of these rates decrease with increasing $H_2O_2$ concentration, presumably due to the passive CuO film formation. Thus there is dynamic balance between CuO formation and direct dissolution apart from the mechanical abrasion during the copper CMP in these slurries.

Surfactants have been added to slurries to stabilize the suspension, to improve wafer to wafer and within wafer uniformity, to decrease defects, and to enhance post-polish cleaning. All nonionic surfactants enhance stability in basic slurries, while the more soluble surfactants are effective in acidic ones. The ionic surfactants are even more effective than the nonionic surfactants at enhancing slurry stability.

Alkaline solution based on $NH_4OH$ is traditionally used in post-CMP cleaning. Tetramethyl $NH_4OH$ (TMAH) based chemicals reduce corrosion, especially at pH values higher than 10. Even in $H_2O_2$, TMAH corrodes copper at a lower rate than $NH_4OH$. Addition of a nonionic surfactant to the TMAH solution reduces copper corrosion significantly.

In oxide CMP for integrated circuits, it is critical to have a uniform post-polish thickness within and across wafers in order to minimize and maintain a low level of dishing and erosion, and to maintain the correct line resistance and interlevel or intralevel capacitance. The oxide erosion increases with high pattern density.

High-density IC areas slow down the CMP process, more than areas with isolated patterns. This is partly due to the dynamic load applied to the feature by the polishing pad. Improper CMP produces residual subsurface damage in the polished Si wafers. Such damage degrades the gate oxide integrity in metal-oxide-semiconductor devices.

Some liquid slurries contain chemicals that are stress-corrosive relative to the outer surface of the material. If the material to be planarized is steel, for example, the stress-corrosive agent may be an inorganic acid such as weak nitric or sulfuric acid. This additive material improves the planarizing speed and productivity, and even the surface finish of the planarized material.

The solid abrasive particles also have marked effects. The polish rate increases significantly only when the abrasive particle concentration exceeds a threshold value. This value correlates with the measured hardness of the thin films to be polished. The particle size critically controls the polishing rate and surface roughness during CMP of the IC interconnect. The tungsten removal rate increases with decreasing size and increasing particle concentration. This suggests that the removal rate mechanism is not a scratching type process, but may be related to the contact surface area between particles and polished surface. The increasing damage measured as depth of scratches on dielectrics is a function of particle size.

Colloidal $SiO_2$ and $Al_2O_3$ particles do not change in particle sizes as a function of slurry pH, but fumed silica particles change at lower pH ranges. Increase of size in fumed silica may be attributed to agglomeration of particles. The reduced direct contacting effect between the solid abrasive particles in the present invention should minimize such agglomeration of particles.

The material removal rate in CMP operations starts slowly, rises rapidly, and levels to an equilibrium value after about 40 seconds. This is ascribed to an increased temperature due to surface change, e.g. oxidation or conversion of copper into copper oxide, and frictional heat at the polishing interfaces. The new pad design of this invention will further insure uniform and reproducible processes of the friction or oxidation and hence, the polishing operation itself.

The present method leads to savings in solid abrasive particles and a high abrasive material use efficiency compared to conventional CMP procedures. That is, the solid abrasive particles consumed in the new planarizing process are only damaged during their actual use in the very planarizing step itself, for reasons above explained.

The invented method also has better control of the abrasive particle size distribution in the planarizing operation. Without much direct contact and self-damage, much or nearly all the solid abrasive particles will retain their original sizes and shape, with reproducibly ever-sharp nascent working edges or points thereby insuring low-cost, uniform planarizing operations to achieve rapidly very fine surface finishes, run after run and part after part.

The slurry stream may be delivered with the usual liquid pressures, nozzle diameters, and spacings of the nozzle from the surface of the polishing wheel. In the new planarizing machines, the nozzle is placed close to the polishing pad 13 in FIG. 1. Specifically, the polishing pad can be within 2 to 6 inches below the nozzle tip. The polishing pad 13 also has a top portion having many laterally spaced, compartmented pockets 21. Each of these compartmented pockets stores a relatively fixed number of the nascent ever-sharp solid abrasive particles 28. Neighboring compartmented pockets 21 are separated by compartment walls 22. The compartmented pockets serve to protect the solid abrasive particles 28 contained therein from being damaged by outside objects including the slurry 18 itself and the other solid abrasive particles flying wildly around, and to keep enough of the suspension liquid medium therein to protectively cover each solid abrasive particle especially at their critical, sharp but brittle working edges or points.

The material removal rate depends on the rotational speed of the polishing pad, pressure on the pad, slurry flow rate, and other parameters. Variations in pad structure and material properties including bulk, pores, and surfaces greatly affect the CMP performance. But the reasons are not well understood. Increased pad hardness improves the control of oxide erosion.

As shown in FIG. 2, the top polishing pad of the invention is made of a resilient material and has its upper section 26 divided into a plurality of laterally spaced, segmented pockets 21 with open tops. Polyurethane plastics, widely used for polishing pads in the glass industry, can also be used in this invention. The colloidal liquid suspension in the slurry fills the segmented pockets and wets the rotating pad so as to hold and mount the material against the rotating pad. The generally freely and stably suspended solid abrasive particles in the liquid suspension medium have nascent, sharp but brittle working edges or points on their outer surfaces for planarizing material surfaces. Generally, these planarizing edges or points are easily damaged. In this invention, however, these same working edges or points are fully protected by the minimized direct contacting of the solid abrasive particles 28 on one another inside each segmented compartment pocket 21.

The polishing pad 13 is made of a resilient material. This material also forms the compartment walls 22 separating the neighboring compartment pockets 21. During planarizing a downward pressure F of generally 2 to 9 psi is temporarily applied through the stem 17 to the top pad material to sufficiently compress the resilient side walls 22 between the segmented pockets 21. The downward temporary compression of the compartment walls 22 exposes the silicon wafer 15 to the rigid, sharp, but brittle edges or points on the abrasive particles 28 contained in the pockets 21. The temporarily exposed solid abrasive particles remove the wafer surface material chemically, or by mechanical action of the pressurized solid abrasive particles on the rotating wafer. Upon releasing the downward pressure, the compartment walls immediately return to better contain or protect the solid abrasive particles in the various compartmented pockets 21.

The new segmented pockets 21 have many functions: 1) minimize loss of the solid abrasive particles 28 and the intervening suspension liquid medium 24 contained in the pockets so that the particles are no longer simply lying on the rotating wheel ready for sliding or spiraling off; 2) minimize damaging contacts of the rigid, sharp but fragile working edges or points on other solid abrasive particles 28; 3) maintain uniform abrasive particle size distribution necessary for reliably uniform smooth surface finish on the planarized material; and 4) provide a cleaner working environment. The location and movement of the solid abrasive particles are highly controlled, while the slurry fluid must stay put and work with the solid abrasive particles 28 to perform the necessary CMP process.

With this new pad design, the angular velocities of the solid abrasive particles 28 and the pad are synchronized at a constant rotational speed of the polishing wheel, at different times and pad locations. The polishing actions on the wafer are uniform and reproducible.

More uniform polishing action of the invention arises for another reason. The centrifugal force and acceleration on the abrasive particle varies with the radial location on the pad, causing uneven motion of the particles on the rotating pad. A compartmented pad structure of the invention restricts the abrasive particles on the pad to be more uniformly moving or distributed.

The most important design for this new planarizing technology is to select the micron (i.e. 0.1 to 1.0 $\mu$m) or nanometer (i.e., $10^{-9}$ to $10^{-5}$ meter) size range solid abrasive particles and the suspension liquid medium to have nearly or substantially the same density. The usual solid abrasive particles are: $Al_2O_3$, $SiO2$, ceria, SiC, diamond, MgO, and PbO having densities of 4.0, 2.65, 3.9, 3.21, 3.53, 3.65–3.97, and 9.5, respectively.

Liquid suspension media may vary in densities from less than 3 to 11 grams/cc and more, as shown below. Liquid suspension may be within 10% or 20% of the density of the above-listed or other solid abrasive particles, or even substantially the same (i.e., within 2–5% of the solid particles density). Various miscible liquids of different densities may, of course, be mixed together and fine-tuned in volume or weight proportions to get any exact required density as needed subject, of course, to constraints such as unwanted chemical reactions, environment safety, and desired use temperatures.

Useful liquid suspension media include, according to Lange's Handbook of Chemistry, J. A. Dean, McGraw Hill, New York 1992: fluorine perchlorate, density 4.95 (melts at −187.3° C.); HBr 3.39 (density) (melts −97.5° C.); HI 5.37 (−30.8° C.); $H_2Te$ 6.234 (−49° C.); $IBr_2$, 4.42 (40° C.); $IF_5$, 3.21 (9.43° C.); $PF_3$, 3.91 (−151° C.); $ReF_6$ 3.38 (18.5° C.);

SbF$_5$, 2.99 (7.0° C.); BiI$_3$, 3.35 (50° C.); GeBr$_4$, 3.13 (26.1° C.); HI, 5.37 (−50.8° C.); RuO$_4$, 3.29 (25.4° C.); SnBr$_4$, 3.35 (30° C.) soluble in hydrochloric, and acetic acid; and tribromomethane CHBr$_3$ 2.90 (18.5° C.) soluble in MeOH and ethyl alcohol. Solubility data are also given above. These solubility data help in preparing the liquid suspension media; and in deciding when a given liquid suspension medium must be diluted with another solvent or when two, three or more different liquid suspension media must be used together in a mixture form to achieve a desired density. Other suitable liquid suspension media may be selected from other chemistry handbooks or reference books on organic or inorganic chemistry. Pure HBr IBr$_2$ PF$_3$ ReF6, BrF3, HBr, and SnBr4, therefore, may be used to prepare the suspension liquid containing Al$_2$O$_3$ abrasive particles. These same suspension medium can also be mixed with other liquid suspension media mentioned above to achieve better or exact density matches between them and the polishing particles.

As usual, input parameters such as polishing pad design, pad type, slurry type, polishing pressure, temperature, backside pressure, and pad speed should be carefully controlled, preferably automatically through modern automation techniques for, for example, the endpoint of the CMP process. Output parameters such as material removal rate, change in removal rate time (an important indicator of solid abrasive material use efficiency), within die uniformity, within wafer uniformity, wafer to wafer uniformity, surface planarity, and planarizing defects including embedded tiny particles and scratches must also be continuously monitored and controlled. Other important performance to be monitored and controlled include: local and global uniformity, within die, within wafer, and wafer to wafer; high productivity and wafer throughout; mean time between machine failure; abrasive slurry use rate; process repeatability; and defect types and content.

The invention, as described above, is not to be construed as limited to the particular forms disclosed herein, since these are to be regarded as illustrative rather than restrictive. For example, magnesia, silicon carbide, ceria, iron or lead oxide and other solid abrasive particles of varying sizes and shapes (such as plates, cubes or ellipsoids) may be used, instead of the usual nanometer or micron size Al$_2$O$_3$ powders. Further, the same principle of protective or cushioning, ever-present and zero-acceleration suspension liquid layer relative to the abrasive particles, can be used not just for protecting the hard, sharp, but fragile working edges or points on the solid abrasive particles, but for other articles of manufacture including knives, tool bits, jewelry, precision machine components, delicate instruments contact or impact sensitive parts, even large-size, completely assembled machineries, electronics systems, microrobotics, etc.

For example, an effective method and equipment for protectively safe-keeping solid objects in an enclosable walled container may be developed according to this invention to prevent physical damage thereof with other solid objects, or with the walls of the container. The solid objects to be protected may be selected from the group consisting of knives, tool bits, jewelry, watches, delicate parts or components, other fragile materials, or even an entire instrument or system. The equipment comprises: a container having a cover or enclosing means; and a liquid which is substantially chemically inert relative to the solid objects. The container is substantially completely filled with both the liquid and the solid objects to be protected. The liquid is selected or carefully prepared to have a density the same as or at least sufficiently close to, the average density of the solid objects. The objects now substantially freely and stably suspend in the suspension liquid.

Further, each solid object is then stably covered with a protective or cushioning layer whose thickness does not change in any selected direction for all static or dynamic conditions of the liquid suspension. This result arises from the lack of differential accelerations, velocities, and movements as discussed above, and minimizes the direct contact of the suspended objects. The container is next covered with the cover or other enclosing means to prevent loss of the liquid from the container. For maximum protection, the container should be substantially completely filled with both the liquid and the solid objects, leaving no or little air or vacant space above the liquid inside the container.

Preferably, the container has rigid outside walls at least partly of a material selected from the group consisting of steel, stainless steel, wood, plastics, aluminum, and titanium. Flexible container walls may also be used. However the container may be flexible (i.e., a plastic bag) Also, the container should preferably be rectangular in shape to facilitate high-density packing of the container together with similar other containers for shipping on a train, truck, airplane, or ship. Suitably designed, other container shapes are also useful.

Added protection may also be provided. A second container is supplied which has another cover or other enclosing means, and is substantially larger than the first container. The first container, after being filled with a first liquid and the solid objects, is put inside the larger second another container with sufficient clearances between the inner walls of the second, larger container and the outer walls of the first, smaller container. The first container is now covered or sealed. Next, a second liquid, (with or without second solid objects) is used to substantially completely fill the clearances between the inner walls of the second, larger container and the outer walls of the first, smaller container. This second liquid and second solid objects have an average density which is sufficiently close to an average density of the first, smaller container containing the first liquid, the cover or other enclosing means, and the first solid objects so that the first, smaller container substantially freely and stably suspends in the second liquid contained in the substantially larger container. In a similar manner, the second, larger container is covered with another cover or other enclosing means to prevent loss of the second liquid from the second, larger container.

The container-in-a-container approach gives added protection to the solid objects to be protected in both containers. The effect of any outside vibration, shock, movement, velocity, acceleration, force, or momentum is first insulated from the first solid objects to be protected by the second, larger outer container wall. Yet, the first, smaller container freely and stably suspending in the second liquid inside the first, smaller container further insulates any similar outside effects by additionally using the rigid walls of the first, smaller container and the first liquid suspension medium to protect the first solid objects freely and stably floating or suspending in the first liquid inside the first, smaller container. Doubled protection of the objects is therefore achieved. Except for very special cases with extremely sensitive solid objects, a third container containing a third liquid, with or without third solid objects, having a special third density is generally not needed.

Telescoping vertical rectangular or cylindrical containers are particularly useful from the viewpoint of ease and efficiency of packing. One may, e.g., start with the smallest vertical cylindrical or rectangular tank, fill this tank with a first liquid, and cover this first tank with a first cover or enclosing means. Next, the next smallest vertical cylindrical or rectangular tank is prepared with a similar procedure but with the filled first tank inserted thereunto, and so on. Finally the largest vertical rectangular tank is prepared, insert thereunto the next largest vertical rectangular tank, fill therein with the last liquid, and cover the last tank for shipping with a last cover.

A series of telescoping horizontal rectangular or non-rectangular containers can also be used. The liquid fillings and tank coverings, however, may need more care to achieve complete filling without loss of the liquids.

Different liquids with different densities must be used for such a vertical or horizontal series of telescoping containers. The liquid densities should preferably vary in a systematic manner so that the first liquid in the smallest innermost container will, for example, be heaviest, while the last liquid for the largest outmost container will be the lightest. These liquids may vary in density from the lightest alcohol (or wine) in the outside container, through intermediate water (pure or sea water), to the special heavy liquids, or gels in the innermost container. The most delicate solid objects, preferably but not necessarily in the innermost container, may also be wrapped in density-modifying (i.e., increasing or decreasing) wrapping to form wrapped containers, which are sealed to be liquid-tight. In this way, even heavy gold jewelry may be wrapped in plastic bubble or foam in combination with wrapping fibers, paper, or sheets, sealed to be liquid-tight, to form the innermost container with a specified density. Light but delicate parts may also be wrapped with, e.g., heavy lead or steel sheets to achieve the desired density for matching the immediately surrounding liquid. In this way, a plurality (m) of solid delicate objects and an equal plurality (m) of special or common liquids may be transported together in an outmost, largest container.

That is, simultaneously, one can ship different liquid and solid objects, together with density-adjusting solid. For example, sheets of gold, platinum, tungsten, lead, steel, copper, nickel, etc. to increase density, but wool, cloth, foam, sponge, plastic bubble, wrapping papers, etc to decrease density. In addition to various liquids including pure water, sea water, wine or liquor, alcohol light or heavy oil, alcohol, special liquid chemicals, in different boxes of varying sizes and materials of construction (e.g., wood, aluminum, steel, titanium, plastic, etc.), may be used for shipping in a single transport vehicle such as ship, truck, plane or car. The various solids and liquids, upon reaching their destinations, can be collected, without any additional sorting or purification, into the different directly saleable commercial items.

Further, the density-adjusting solid, whether to increase or decrease density of the packaged objects, need not necessarily be inside the smallest or largest container, but may be included in any container of the series. The construction material of the container may be any solid or plastic sheet, used for containers of any size. The liquid to be shipped also can occupy in any position or orientation in the container series.

It is easily seen that a new grinding or polishing suspension can also be made comprising: a liquid suspension medium having a liquid density $d_m$, and a plurality of solid abrasive grinding or polishing particles having a substantially constant solid density $d_s$ and suspended in the liquid suspension medium. The liquid density $d_m$ is within 15% of the substantially constant solid density $d_s$ whereby the plurality of the solid abrasive grinding or polishing particles generally freely and stably suspend in the liquid suspension medium minimizing damages of grinding and polishing qualities of the solid particles through reduced contacting of the abrasive grinding or polishing solid particles on each other and one another. For better results, the liquid density $d_m$ is within a specified percentage of the substantially constant solid density $d_s$, where the specified percentage is 10, 5, or 2.5%.

As usual, each of the solid abrasive particles has sharp working edges or points for performing the required grinding and polishing functions. The generally freely and stably suspended solid abrasive particles in the liquid suspension minimize damages of the grinding and polishing qualities of the solid abrasive particles through their reduced contacting with one another or with the container walls thereby preserving the sharp working edges or points for performing the grinding and polishing functions.

These and many other new applications provide various combinations, equivalent substitutions, or other modifications of the preferred embodiments described in this specification. All these variations are obviously possible in light of the description, without departing from the spirit of the invention. For instance, density-modifying materials such as light-density plastic bubble wrapping papers or high-density lead, gold or other metal sheets can package almost any object so that the thus-packaged object has substantially the same density as that of a selected liquid suspension medium. Fluid-tight adhesive tapes can then be used to seal the package making it fluid tight and constant in density. In this way, a plurality of different touch or impact-sensitive objects having even widely varying densities can be made into packages of the same density. All of these new packages can be protectively shipped in a single large shipping container containing only the selected liquid suspension media.

Accordingly, the invention is to be limited only as indicated by the scope of the appended claims.

We claim:

1. A method for planarizing an outer surface of a material comprising:

supplying a rotating wheel for mounting the material thereon:

holding and mounting the material against the rotating wheel with the outer surface of the material facing upward;

providing a liquid suspension, said liquid suspension comprising a liquid suspension medium of a specific liquid density and a plurality of solid abrasive particles of a substantially constant solid density, for planarizing the outer surface of the material;

selecting the specific liquid density to be within 15% of the substantially constant solid density whereby at least a majority of the plurality of said solid abrasive particles are generally freely and stably suspended in the liquid suspension medium without gravitational settling and separation thereby minimizing damaging contact of the solid abrasive particles whereby the abrasive liquid suspension will have a much longer life limited only by its actual use in said planarizing process;

causing the rotating wheel to rotate with the material mounted and held thereon; and applying a pressure to the mounted material to remove at least a portion of an outer surface thereof by a mechanical action of the solid abrasive particles on the rotating mounted material.

2. A method as in claim 1 wherein:

the supplying step comprises supplying the rotating wheel with a top pad for mounting the material thereon, said top pad rotating with said wheel;

said top pad is of a resilient material and has an upper section divided into a plurality of laterally spaced, segmented pockets with open tops;

the providing step comprises providing a colloidal liquid suspension which fills the segmented pockets and wets the rotating pad; and the generally freely and stably suspended solid abrasive particles in the liquid suspension medium have rigid, sharp, but brittle working edges and points on the outer surfaces thereof for planarizing the outer surface of the mounted material; and the working edges and points on the solid abrasive particles are protected from being damaged by the reduced contact of the solid abrasive particles with each other inside each segmented pocket.

3. A method as in claim 2 wherein the applying step comprises applying a pressure to the top pad to sufficiently compress a resilient upper section of the pad to expose, at least temporarily, the rigid, sharp, but brittle working edges and points on the solid abrasive particles contained in the segmented pockets for removing at least a portion of the outer surface of the mounted material by mechanical action of the pressurized solid abrasive particles on the rotating mounted material.

4. A method as in claim 1 wherein the applying step comprises applying a pressure of from 2 to 9 psi.

5. A method as in claim 1 wherein the causing step comprises activating the rotating wheel to rotate about a substantially vertical axis at a speed of over 30 rpm.

6. A method as in claim 1 wherein the liquid suspension medium has an additional property of being chemically corrosive relative to the outer surface of the mounted material to chemically remove a surface layer of said outer surface.

7. A method as in claim 1 wherein the solid abrasive particles consist essentially of $Al_2O_3$.

8. A method as in claim 1 wherein the specific liquid density of the suspension medium is within 10% of the substantially constant solid density of the solid abrasive particles and the majority of the solid abrasive particles are freely and stably suspended in the liquid suspension medium thereby minimizing damage caused by the solid abrasive particles contacting each other.

9. A method as in claim 8 wherein the specific liquid density is within 5% of the substantially constant solid density of the solid abrasive particles.

10. A method as in claim 8 wherein each of said at least majority of the solid abrasive particles has sharp working edges and points for performing grinding and polishing functions.

11. A method as in claim 8 wherein said at least majority of said solid abrasive particles all have sizes within a fixed percentage of a common average size.

12. A method for planarizing a material on a planarizing platform, said planarizing platform moving relative to said material, said method comprising:

supplying a liquid suspension to said material comprising a plurality of solid abrasive particles suspended in a liquid suspension medium; and selecting said liquid suspension medium to have a liquid density approximately close to that of an average solid density of said abrasive particles so that said solid abrasive particles stably and freely suspend in said liquid suspension medium without significant gravitational settling and gravitational separation, whereby differential acceleration, velocity, and movement due to differing densities of said solid abrasive particles and said liquid suspension medium are minimized.

13. The method as in claim 12 wherein said sufficiently close solid and liquid densities minimize differential movement velocity, acceleration, or forces between any two neighboring abrasive particles, relative to each another, to the container wall of the suspension and also to the suspension liquid medium, because the suspension liquid medium and the solid abrasive particles have nearly the same density, mass per unit or given volume, velocity, and acceleration whereby there is little direct force exchange and momentum transfer between neighboring solid abrasive particles so that the brittle working edges and points on said solid particles are protected.

14. The method as in claim 12 wherein said approximately close solid and liquid densities cause the liquid suspension medium between any two neighboring solid abrasive particles, and between one abrasive particle and the nearby wall of the liquid container, to be neither reduced nor increased appreciably in thickness thereby constantly providing an effective cushioning and protective layer between these two neighboring particles and between the one solid abrasive particle and a nearby liquid container wall.

15. The method as in claim 12 including:

providing a respective ever-present protective and cushioning layer of a substantially fixed thickness all around each solid abrasive particle to prevent its direct contact with its neighbors and with another solid object thereby preserving critical tiny, rigid, sharp but brittle working edges and points on these solid abrasive particles.

16. The method as in claim 12 wherein said planarizing platform is a planar platform.

17. The method as in claim 12 wherein said planarizing platform is a horizontal circular planar platform rotating about a center of said circular planar platform; and said relative motion is a sliding motion on a generally circular path.

18. The method as in claim 12 wherein the liquid and solid density difference is less than 15%; and including providing hard and ever-sharp working edges and points on the solid abrasive particles to produce superior planarizing results.

19. The method as in claim 12 wherein said solid abrasive particles are in a micron to nano-size range.

20. The method as in claim 12 including controlling at least one liquid suspension property selected from the group consisting of pH, temperature, slurry abrasive particle composition, stream size and shape, degree of agglomeration, liquid suspension weight percent, material removal rates, materials dissolution, liquid suspension flow rate, liquid suspension stability, material properties, interlevel dielectric erosion, and chemical corrosion.

21. The method as in claim 12 including providing a uniform post-polish thickness within and across integrated circuit wafers to minimize and maintain a low level of dishing and erosion during oxide chemical-mechanical polishing.

22. The method as in claim 12 including maintaining a correct line resistance and interlevel and intralevel capacitance.

23. The method as in claim 12 including producing a uniform surface layer thickness with little residual subsurface damage in polished silicon wafers to thereby enhance quality of gate oxide integrity in high-density metal-oxide semiconductor devices; and providing an additive material to improve planarizing speed and productivity, and surface finish of the planarized material.

24. The method as in claim 12 including, providing abrasive particle size control for reproducibly achieving superior surface finishes during CMP of integrated circuit interconnects.

25. The method as in claim 12 including achieving reproducible CMP process through control of the solid abrasive particle size distribution in the planarizing operation.

26. The method as in claim 12 including covering said solid abrasive particles with a liquid suspension medium to prevent their exposure to the material to be planarized;

temporarily exposing said solid abrasive particles during the CMP process, thereby exposing said solid abrasive particles to the material to be planarized; and rapidly recovering the solid abrasive particles with a surface-protecting film of the liquid suspension medium.

27. The method as in claim 12 including covering said solid abrasive particles to prevent their exposure to the material to be planarized;

temporarily exposing said solid abrasive particles to the material to be planarized; and after said exposing step, immediately covering the solid abrasive particles with a surface-protecting film of the liquid suspension medium.

28. The method as in claim 12 including providing, on the planarizing platform during the actual CMP process, tiny retaining walls to achieve at least one of the following functions:

1) minimizing loss of said solid abrasive particles and the intervening liquid suspension medium;
2) minimizing damaging contacts of the rigid, sharp but fragile working edges and points at selective compartments and locations;
3) maintaining uniform abrasive particle size and shape distribution necessary for reliably uniform smooth surface finishes on the planarized material;
4) providing a cleaner working environment;
5) controlling the solid abrasive particles onto preselected locations on the planarizing platform;
6) synchronizing at a constant rotational speed selected groups of said solid abrasive particles at different times on the planarizing platform locations to insure uniform and reproducible polishing action; and
7) restricting movement and distribution of said solid abrasive particles on said planarizing platform.

29. The method as in claim 12 including adjusting density of at least one of said liquid suspension and said solid abrasive particles to be nearly the same as that of the other, whereby said solid abrasive particles are insulated from any outside vibration, shock, movement, velocity, acceleration, force, and momentum by the completely surrounded nearly equal-density liquid suspension medium;

said selecting step comprising selecting a liquid suspension medium to have a liquid density differing from said solid density by less than a density differential selected from the group consisting of 2.5%, 5%, and 10%.

30. The method as in claim 12 including using automation techniques to automatically control CMP input characteristics selected from the group consisting of planarizing platform design, liquid suspension medium, polishing pressure, temperature and relative platform speed.

31. The method as in claim 12 including automatically monitoring and controlling at least one of the CMP performance characteristics selected from the group consisting of material removal rate, change in removal rate, time, use efficiency, within die uniformity, wafer uniformity, wafer to wafer uniformity, surface planarity, and planarizing defects, local and global uniformity, productivity and wafer throughput, mean time between machine failures, liquid suspension usage rate, process repeatability and defect types and content.

32. The method of claim 12 including maintaining a correct line resistance and interlevel and intralevel capacitance; and producing a uniform surface layer thickness with little residual subsurface damage in a polished semiconductor wafer enhancing quality of gate oxide integrity in high-density metal-oxide semiconductor devices.

33. A method for planarizing a material comprising:

providing a planarizing platform moving relative to said material;

supplying a liquid suspension comprising a plurality of solid abrasive particles suspended in a liquid medium;

said liquid suspension medium having a liquid density no less than that of ethyl alcohol;

selecting said solid abrasive particles to have a specified solid density of no more than 9.5 and to have a shape selected from the group consisting of round powders, plates, cubes, and ellipsoids; and selecting said liquid suspension medium to have a liquid density approximately close to that of an average density of said solid abrasive particles so that said solid abrasive particles stably and freely suspend in said liquid suspension medium without significant gravitational settling and separation, eliminating differential accelerations, velocities, and movements due to differing densities of said solid abrasive particles and said liquid suspension medium, whereby touching compacting, contacting and impacting of sharp edges and points on said solid abrasive particles is reduced to prevent the degradation of the performance of the solid abrasive particles.

\* \* \* \* \*